United States Patent [19]

Barman

[11] Patent Number: 4,506,472

[45] Date of Patent: Mar. 26, 1985

[54] SPRING-LOADED SNARE

[76] Inventor: David A. Barman, 2250 Scranton Rd., Norwalk, Ohio 44857

[21] Appl. No.: 481,801

[22] Filed: Apr. 4, 1983

[51] Int. Cl.³ .............................................. A01M 23/34
[52] U.S. Cl. ................................... 43/87; 119/153
[58] Field of Search ............... 43/85, 86, 87; 119/153; 124/1, 16

[56] References Cited

U.S. PATENT DOCUMENTS

| | | | |
|---|---|---|---|
| 3,029,539 | 4/1962 | Glass et al. | 124/16 |
| 3,032,924 | 5/1962 | Carver | 124/16 |
| 3,949,514 | 4/1976 | Ramsey | 43/87 |
| 4,208,827 | 6/1980 | Starkey | 43/87 |
| 4,250,653 | 2/1981 | Davies | 43/87 |

FOREIGN PATENT DOCUMENTS

| | | | |
|---|---|---|---|
| 433943 | 9/1926 | Fed. Rep. of Germany | 124/16 |
| 686705 | 9/1979 | U.S.S.R. | 43/87 |

Primary Examiner—Nicholas P. Godici
Assistant Examiner—M. Jordan
Attorney, Agent, or Firm—Fay & Sharpe

[57] ABSTRACT

A tubular member (A) defines an internal bore (10) in which an inertia assembly (B) for providing a selected inertial force is disposed. The inertia assembly includes a spring (20) and a slidable member (22). An elongated, flexible cable (C) extends from the slidable member, through the tubular member internal passage, and defines a contractible loop externally of the tubular member. Under manual urging of a handle (36) which is operatively connected with a sleeve (34), the sleeve urges the slidable member longitudinally along the tubular member internal passage extending the spring. The slidable member cams a blocking member (70) outward to allow the slidable member to move therepast. After the slidable member is moved toward the tubular member second end past the blocking member, the blocking member blocks the slidable member against return sliding movement. A trigger (78) selectively withdraws the blocking member to allow the slidable member to undergo return sliding movement rapidly contracting the cable. The momentum with which the inertia assembly contracts the cable is selected to be sufficiently strong that the cable breaks a prey's neck, killing it instantly but not so strong that the cable damages the pelt.

11 Claims, 2 Drawing Figures

SPRING-LOADED SNARE

BACKGROUND OF THE INVENTION

The present invention relates to weaponry. The present invention finds particular application in conjunction with spring-loaded snares. However, it is to be appreciated that the invention is also applicable to other snare, gun, and analogous arrangements. Although the present invention is particularly adapted for use by trappers, the present invention does not relate to a trap per se.

Many traps, such as the commonly used leg hold trap, catch their prey alive. This has necessitated that the trapper, himself, kill the prey. One method of killing the prey has been with a gun or rifle. However, shooting prey which is trapped for pelts is apt to damage the pelt. Further, some animals, particularly foxes, will avoid areas which are tainted with the blood of their species.

To avoid damaging the pelts, bleeding in the trap area, and the cost of shells, many trappers kill the prey with a club. Clubbing is objectionable on humane grounds in that it rarely kills the prey quickly, without pain. Further, attempting to club larger or more ornery prey may be dangerous to the trapper.

The present invention contemplates a new and improved apparatus which enables the trapper to kill trapped prey safely, painlessly, and inexpensively.

SUMMARY OF THE INVENTION

In accordance with the present invention, there is provided a spring-loaded snare. A sturdy elongated tubular member defines an internal passage longitudinally therein. An inertia means which provides a selective inertial force is disposed in the internal passage for movement therealong. A cable extends from the internal passage to define a contractible, closed loop externally of the internal passage. The cable is connected by at least one end with the inertia means such that the loop is selectively contractible by the inertia means. A triggering means selectively allows the inertia means to contract the cable loop.

In accordance with a more limited aspect of the invention, the inertia means includes a spring extending longitudinally through the tubular member internal passage. One end of the spring is connected with the tubular member and the other end is connected with a weight slidably disposed in the internal passage. A cocking means selectively elongates the spring and slides the weight through the tubular member internal passage into engagement with the triggering means. The triggering means maintains the weight in a preselected, cocked position with the spring elongated. Upon releasing the triggering means, the potential energy of the elongated spring is converted to kinetic energy by the contracting spring, sliding the weight through the internal passage, and contracting the cable loop with an internal force as determined by the spring constant of the spring, the mass of the weight, and the elongation of the spring.

One advantage of the present invention is that it kills prey quickly, safely, and painlessly.

Another advantage of the present invention is that it kills the prey without damage to the pelt.

Yet another advantage of the present invention is that it is relatively inexpensive to operate.

Still further advantages of the present invention will become apparent to others upon reading and understanding the following detailed description of the preferred embodiments.

BRIEF DESCRIPTION OF THE DRAWINGS

The invention may take form in various parts and arrangements of parts. The drawings are only for purposes of illustrating preferred embodiments of the invention and are not to be construed as limiting it.

DESCRIPTION OF THE PREFERRED EMBODIMENTS

With reference to the FIGURES, the spring-loaded snare includes a tubular member A which supports an inertia means B for providing a selected inertial force. An elongated, flexible cable C extends from the tubular member and is connected with the inertia means to be selectively contracted thereby with the selected inertial force. A triggering means D selectively releases the inertia means to contract the cable. The inertial force is selected such that the cable breaks the prey's neck, killing it instantly.

Figure 1:
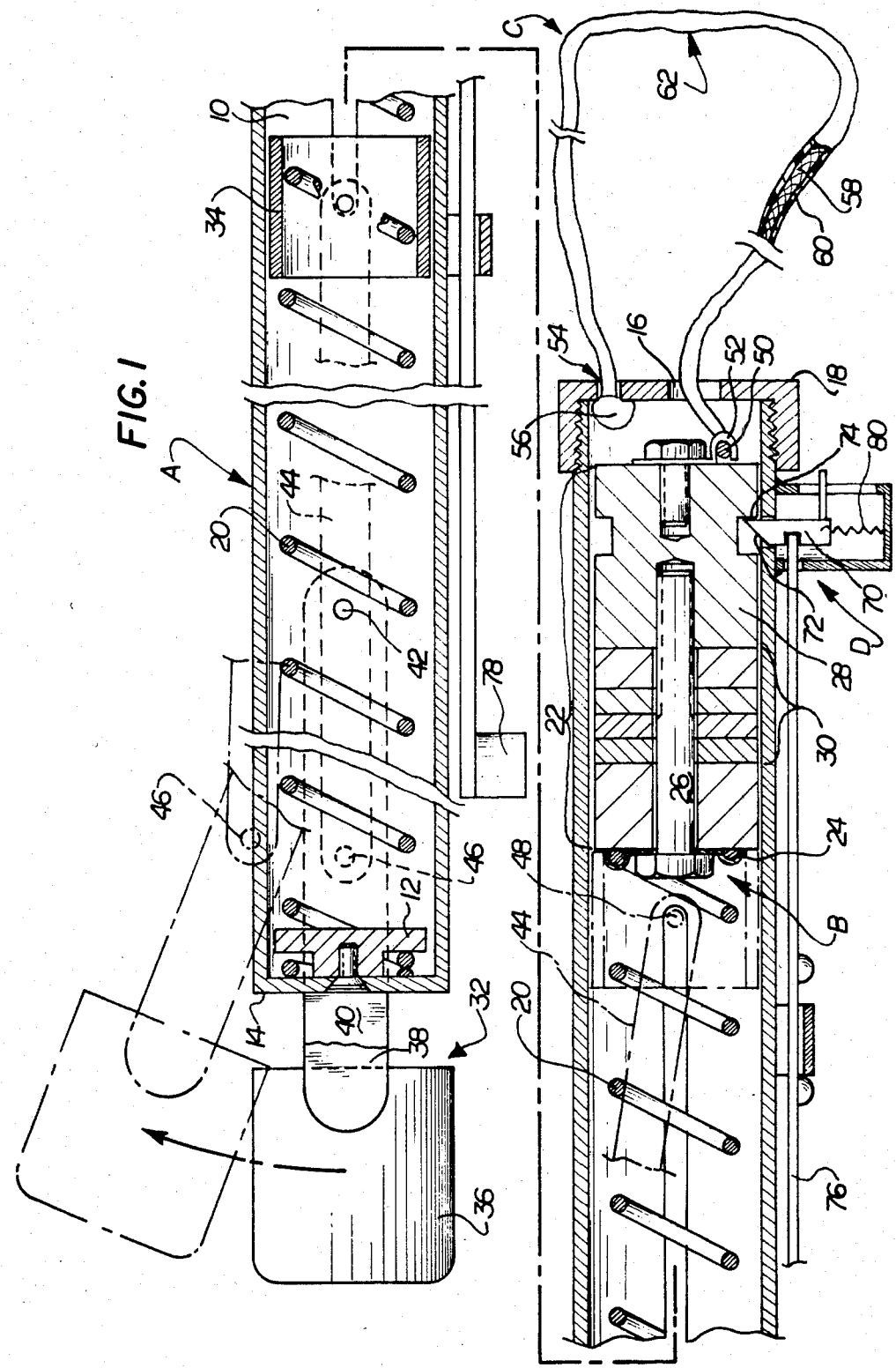
FIG. 1 is a longitudinal, cross-sectional view of a spring-loaded snare in accordance with the present invention; and, FIG. 2 is a cross-sectional view of an alternate embodiment of the present invention which is primarily adapted for use with small game.

With particular reference to FIG. 1, the tubular member A, such as a sturdy, steel pipe or tube, defines an internal passage 10 therein. A spring mounting means 12 is disposed adjacent a first end 14 of the tubular member. A cable outlet opening 16 in communication with the internal passage 10 is disposed adjacent a second end 18 of the tubular member.

In the preferred embodiment, the inertia means B develops the selected inertial force from a combination of an urging means, such as a spring 20, and a slidable member 22 urged thereby. More specifically, the inertial force is proportional to the spring constant of the spring, the mass of the slidable member, and the square of the displacement of the spring. One end of the spring is connected with the spring mounting means 12 and the other end is connected with the slidable member 22 by a second spring mounting means 24, e.g. a weld. In the preferred embodiment, the second spring mounting means includes a bolt or machine screw 26 which is threadedly received in the slidable member to clamp one end of the spring thereto. The slidable member 22 has a selectively adjustable mass. Specific to the embodiment of FIG. 1, slidable member includes a first section 28 having a threaded bore therethrough which receives the machine screw 26 and a plurality of removable sections 30. This enables additional sections of similar construction to be added or removed for selectively adjusting the inertial force. Optionally, other inertial force adjusting means may be provided, e.g. means for adjusting the length of the spring. The inertial force is selectively adjustable to correspond to the size of the prey. With small prey, a relatively small inertial force is required to break the prey's neck. With larger prey, a larger inertial force is required. if the inertial force is to small, the prey will be killed by strangulation rather than the quick, painless neck breaking. Too large an inertial force can damage the pelt. Accordingly, it is desirable to adjust the inertial force to correspond to the prey being trapped.

Further to the preferred embodiment, the inertial force is provided by elongating the spring 20 and allowing it to contract. Alternately, the spring may be disposed toward the second tubular member end 18 such that it is selectively compressed and expands to impart the selected inertial force. As yet further alternatives, the spring may be replaced by other urging means such as a compressed gas charge from an air pump or a compressed gas cylinder. The compressed gas is selectively released to slide the slidable member along the tubular member internal passage. As yet another alternative, the urging means may include an explosive charge, such as a 22 caliber blank cartridge. The cartridge is located such that the explosive force which it generates urges the slidable member to undergo the sliding movement along the tubular member internal passage.

A cocking means 32 is provided for moving the slidable member and spring to a high potential or stored energy position. In the preferred embodiment, the cocking means extends the spring. The cocking means includes a slidable sleeve 34 which slides along the internal passage of the tubular member around the periphery of the spring. A handle means 36 is operatively connected with the slide member for urging the sleeve, and with it the slidable member, to the high potential energy storage position. In the embodiment of FIG. 1, a pair of lever arms 38 and 40 connected in parallel are pivotally connected at one end by a pivot means 42 at one end with the tubular member and connected with the handle 36 at the other. A pair of connecting rods includes a first connecting rod 44 and a second parallel connecting rod (obscured in FIG. 1) are pivotally connected by a pivot means 46 with the lever arms and pivotally connected by a pivot means 48 with the sleeve 34. The position of the pivot means 46 along the lever arms select the mechanical advantage to be enjoyed. By positioning the pivot means 46 closer to pivot means 42, the mechanical advantage is improved and the distance of travel of the handle 36 lengthened. By moving the pivot means 46 closer to the handle, the length of travel of the handle is shortened.

The cable C is connected at a first end 50 with the slidable member 22 by a first cable connecting means 52. A second end of the cable 54 is connected by a second cable connecting means 56 adjacent the tubular member second end 18. The cable C has an inner core of woven steel wire 58, e.g. eighth inch braided steel wire, and a plastic coating 60 therearound. The plastic coating 60 prevents the wire from rusting and corroding in the frequently damp environment of its normal, intended use. The cable defines a loop 62 of sufficient diameter when the slidable member is in the high potential energy position to be slipped easily around the neck of the prey. When the spring is released and moves to its contracted position, the loop is smaller than the diameter of the neck of the intended prey.

The trigger D includes a blocking member 70 having a camming surface 72 disposed toward the tubular member first end and a blocking surface 74 disposed toward the tubular member second end. The blocking member is movable toward an inward position, illustrated in FIG. 1, in which it extends inward into the tubular member internal passage to engage the slidable member 22. The blocking member is movable outward toward an outward position in wich it permits the slidable member to pass thereby. The blocking member is connected by a connecting linkage 76 with a manual releasing means or trigger 78. Manually actuating the release means 78 allows a trigger spring 80 to move the blocking member 70 toward the outward position, allowing the slidable member 22 to slide along the tubular member internal bore under the urging of the extended spring 20.

Figure 2:
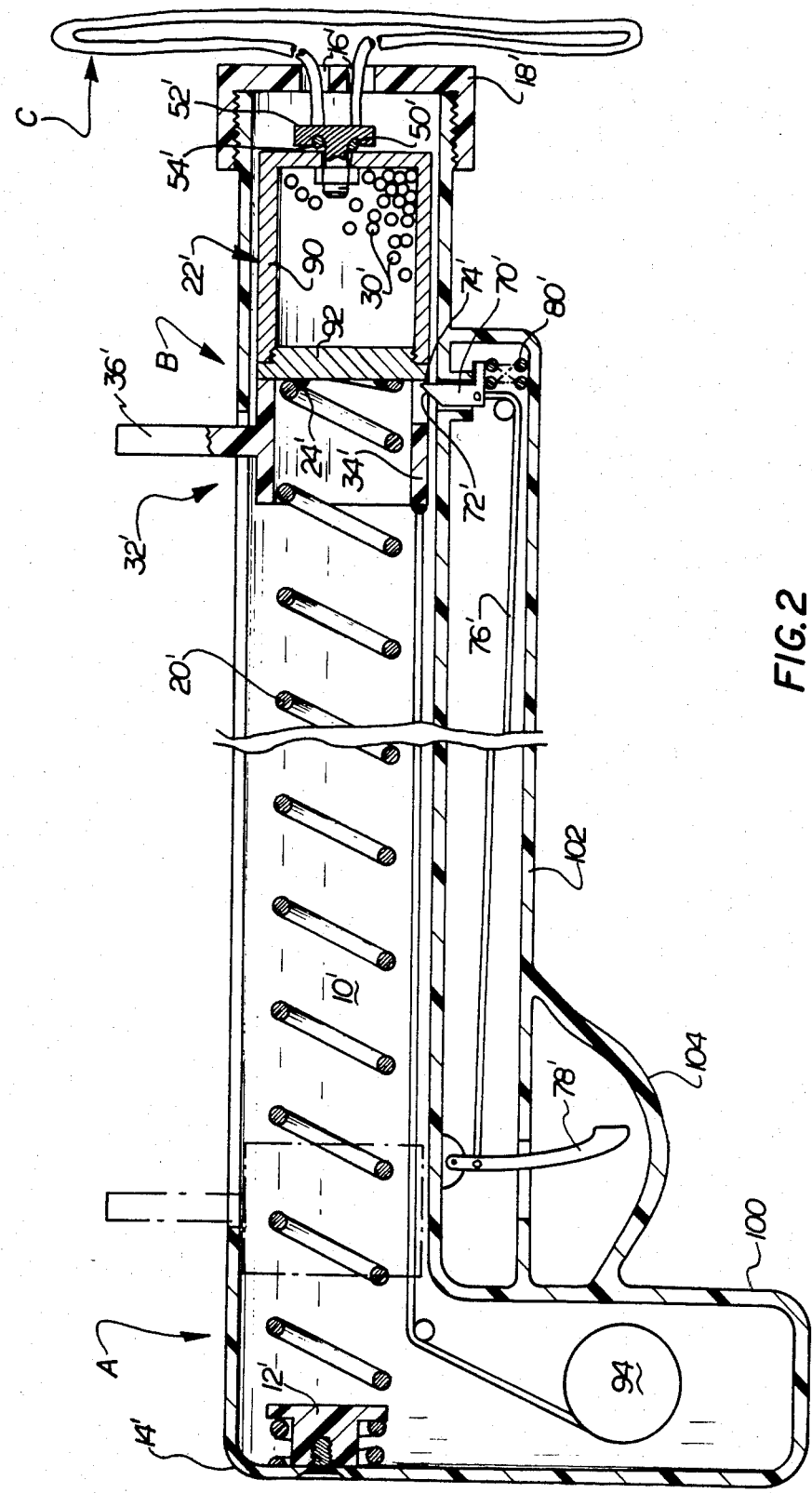

In the embodiment of FIG. 2, like elements with the elements of FIG. 1 are denoted by like reference numerals but followed by a prime ('). The tubular member A has an internal bore 10' with a spring mounting means 12' at a first end 14'. A cable outlet opening 16' is defined adjacent a tubular member second end 18'.

The inertia means B includes a selectively elongatable spring 20' and an adjustable mass slidable member 22'. The slidable member 22' includes a hollow housing 90 having a threaded cap 92 to which the spring is connected by a spring connecting means 24' such as a weld is mounted. A selectable amount of shot 30' is placed within the housing 90 to adjust the mass, hence the inertial force provided by the inertia means.

A cocking means 32' includes a sleeve 34' which is slidably disposed in the internal bore 10'. A handle means 36' is connected with the slidable sleeve 34' and extends through an elongate open passage in a sidewall of the tubular member. A cocking means biasing spring 94 biases the sleeve 34' toward the first end 14'. The handle 36' manually urges the member 34' and the slidable member forward toward the second end 18' elongating the spring. After the slidable member 22' is moved toward the second end sufficiently to be engaged by the trigger means D, the handle member 36' is released and the cocking means biasing spring 94 returns the sleeve and handle to a position adjacent the tubular member first end. In this manner, when the slidable member 22' is released, the handle means 36' does not move therewith endangering the operator.

The cable C has a first end 50' and a second end 54' which are connected with the slide member 22' by a connecting means 52'. Preferably, the cable is again plastic coated, woven steel.

The trigger means D includes a blocking member 70' which is selectively movable between an inward position, shown in FIG. 2, which blocks sliding movement of the slidable member 22' with a blocking surface 74'. A camming surface 72' is engaged by the slidable member as it is moved toward a high potential energy position adjacent the tubular member second end. The slide member cams the blocking member 70' against a trigger spring 80' toward an outward position allowing the slidable member to move therepast. A flexible connecting cord or link 76' connects the blocking member with a manually operable trigger 78'.

In the embodiment of FIG. 2, the tubular member is constructed of high impact plastic and is integrally molded with a handle portion 100, a trigger mechanism guarding portion 102, and a trigger guard 104. The tubular member is molded of sufficient thickness to withstand the impacts imparted by the inertia means. Optionally, the tubular member may be constructed of steel, fiber reinforced plastic, aluminum alloys, or the like. The plastic construction is suggested for use primarily when the spring operated snare is dimensioned for small animals, such as minks, and the cast metal construction is suggested when the snare is intended for use with larger animals, such as fox.

The invention has been described with reference to the preferred embodiments. Obviously, modifications and alterations will occur to others upon reading and understanding the preceding specification. It is intended that the invention be construed as including all such alterations and modifications insofar as they come within the scope of the appended claims or the equivalents thereof.

Having thus described preferred embodiments of the invention, the invention is now claimed to be:

1. A lethal spring-loaded snare comprising:
   a sturdy elongated tubular member defining an internal passage longitudinally therein;
   an adjustable inertia means for providing a selectable inertial force, the inertia means being disposed in the internal passage for movement therealong;
   an elongated, flexible cable having at least one end operatively connected with the inertia means, the cable defining a closed loop which is selectively contracted by the inertia means with said selected inertial force;
   a cocking means for causing the inertia means to store potential energy;
   triggering means for selectively causing the inertia means to convert the stored potential energy to a corresponding amount of kinetic energy to contract the cable loop with the selected inertial force; and,
   adjustment means for adjusting the amount of potential energy stored by the inertia means, such that the selected inertial force with which the loop is contracted is adjusted to be sufficiently great to break the neck of a preselected prey yet sufficiently small that the pelt is undamaged.

2. A snare comprising:
   a sturdy elongated tubular member defining an internal passage longitudinally therein;
   a slidable member disposed in the internal passage for sliding movement longitudinally therealong, the slidable member having an inertial mass which is selectively adjustable;
   a means for urging the slidable member with a selected inertial force to undergo the sliding movement along the internal passage;
   an elongated, flexible cable having at least one end operatively connected with the slidable member, the cable defining a closed loop which is selectively contracted with said selected inertial force; and,
   a trigger means for selectively blocking the slidable member against the sliding movement and releasing the slidable member to undergo the sliding movement with the selectively adjustable force.

3. A spring-loaded snare comprising:
   a sturdy elongated tubular member defining an internal passage longitudinally therein;
   a slidable member disposed in the internal passage for sliding movement longitudinally therealong;
   a spring for urging the slidable member with an urging force to undergo the sliding movement along the internal passage;
   an elongated, flexible cable having at least one end operatively connected with the slidable member, the cable defining a closed loop which is selectively contracted by the spring;
   triggering means for selectively blocking the slidable member against the sliding movement and releasing the slidable member to undergo the sliding movement to contract the cable loop; and,
   a cocking means including:
   a sleeve slidably disposed in the internal passage surrounding the spring and selectively abutable with the slidable member; and,
   a handle means operatively connected with the sleeve for manually moving the slidable member against the spring urging force until the trigger means selectively blocks the slidable member against return sliding movement such that potential energy is stored in the spring.

4. The snare as set forth in claim 3 wherein the cocking means further includes:
   a lever arm pivotally connected at a first end with the tubular member and operatively connected with the handle means at a second end;
   a connecting rod pivotally connected at one end with the lever arm and pivotally connected at the other end with the sleeve, such that the lever arm provides a mechanical advantage to facilitate moving the slidable member against the spring urging force.

5. The snare as set forth in claim 3 wherein the trigger means includes:
   a blocking member disposed to be selectively moved transversely inward and outward of the internal passage, the blocking member including a blocking surface for blocking the slidable member against movement and a camming surface for camming the blocking member outward as the cocking means slides the slidable member therepast.

6. The snare as set forth in claim 3 wherein the cable is plastic coated woven steel.

7. An apparatus comprising:
   an elongated tubular member which defines an internal passage, the tubular member being substantially closed at a first end and defining a cable outlet in communication with the internal passage at a second end;
   an expandable spring disposed longitudinally in the internal passage;
   a first spring connecting means for connecting a first end of the spring with the tubular member adjacent the tubular member first end;
   a slidable member disposed in the tubular member internal passage for sliding movement therealong;
   a second spring connecting means for operatively connecting a second end of the spring with the slidable member;
   cocking means for selectively elongating the spring and sliding the slidable member toward the tubular member second end for storing potential energy in the spring, the cocking means including:
   a sleeve slidably disposed in the internal passage surrounding the spring and selectively abutable with the slidable member;
   a handle means operatively connected with the sleeve for manually moving the slidable member against the spring urging force until the blocking member selectively blocks the slidable member against return sliding movement;
   a lever arm pivotally connected at one end with the tubular member and operatively connected with the handle means at another end; and,
   a connecting rod pivotally connected at one end with the lever arm and pivotally connected at another end with the sleeve, such that the lever arm provides a mechanical advantage to facilitate moving the slidable member against the spring urging force;
   a blocking member disposed for selective transverse movement to an inward position in the internal passage and toward an outward position outward from the inward position, the blocking member disposed generally adjacent the tubular member second end for engaging the slidable member in the inward position to block the slidable member from sliding movement toward the tubular member first end;

releasing means for selectively moving the blocking member toward the outward position to allow potential energy stored into the extended spring to be transformed into kinetic energy urging the slidable member to slide along the tubular member internal passage toward the tubular member first end; and, a flexible cable having at least one end operatively connected with the slidable member, extending through the cable outlet, and defining a loop externally of the tubular member internal passage, the loop being contracted as the slidable member moves toward the tubular member first end.

8. The apparatus as set forth in claim 7 wherein the releasing means is disposed adjacent the tubular member first end, whereby an operator is displaced from the cable loop by substantially the length of the tubular member.

9. The apparatus as set forth in claim 7 wherein the one end of the cable is connected with the tubular member adjacent the tubular member second end.

10. The apparatus as set forth in claim 7 wherein the cocking means further includes:

a second lever arm disposed parallel to the first lever arm, pivotally connected with the tubular member, and connected with the handle means, the first and second lever arms having a length such that the handle is selectively disposable in longitudinal alignment with the tubular member adjacent the tubular member first end.

11. An apparatus comprising:

an elongated tubular member which defines an internal passage, the tubular member being substantially closed at a first end and defining a cable outlet in communication with the internal passage at a second end;

an expandable spring disposed longitudinally in the internal passage;

a first spring connecting means for connecting a first end of the spring with the tubular member adjacent the tubular member first end;

a flexible cable extending through the cable outlet, and defining a loop externally of the tubular member internal passage, the loop being contracted as the slidable member moves toward the tubular member first end;

a slidable member disposed in the tubular member internal passage for sliding movement therealong;

at least one end of the cable being operatively connected with the slidable member such that the loop is contracted as the slidable member moves toward the tubular member first end, the slidable member having a selectively adjustable mass such that the inertial force with which the cable loop is contracted is selectively adjustable;

a second spring connecting means for operatively connecting a second end of the spring with the slidable member;

cocking means for selectively elongating the spring and sliding the slidable member toward the tubular member second end for storing potential energy in the spring;

a blocking member disposed for selective transverse movement to an inward position in the internal passage and toward an outward position outward from the inward adjacent the tubular member second end for engaging the slidable member in the inward position to block the slidable member from sliding movement toward the tubular member first end; and, releasing means for selectively moving the blocking member toward the outward position to allow potential energy stored into the extended spring to be transformed into kinetic energy urging the slidable member to slide along the tubular member internal passage toward the tubular member first end.

* * * * *